(12) United States Patent
Dietrich et al.

(10) Patent No.: US 9,000,323 B2
(45) Date of Patent: Apr. 7, 2015

(54) METHOD FOR CONNECTING A SHAFT AND A HUB AND SHAFT-HUB ARRANGEMENT

(75) Inventors: Alexander Dietrich, Ehrenhausen (AT); Markus Schuiki, Eibiswald (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 12 days.

(21) Appl. No.: 13/575,743

(22) PCT Filed: Dec. 23, 2010

(86) PCT No.: PCT/EP2010/070703
§ 371 (c)(1),
(2), (4) Date: Jul. 27, 2012

(87) PCT Pub. No.: WO2011/091926
PCT Pub. Date: Aug. 4, 2011

(65) Prior Publication Data
US 2012/0294671 A1 Nov. 22, 2012

(30) Foreign Application Priority Data

Jan. 27, 2010 (DE) .......................... 10 2010 005 873

(51) Int. Cl.
| | |
|---|---|
| *B23K 11/00* | (2006.01) |
| *B23K 11/14* | (2006.01) |
| *B23K 33/00* | (2006.01) |
| *B23P 11/00* | (2006.01) |
| *F16D 1/068* | (2006.01) |
| *F16D 1/072* | (2006.01) |
| *F16D 1/092* | (2006.01) |

(52) U.S. Cl.
CPC ............... *B23K 11/002* (2013.01); *B23K 11/14* (2013.01); *B23K 33/006* (2013.01); *B23K 2201/06* (2013.01); *B23P 11/00* (2013.01); *F16D 1/068* (2013.01); *F16D 1/072* (2013.01); *F16D 1/092* (2013.01)

(58) Field of Classification Search
CPC .......... B23K 11/02; B23K 33/00; F16L 13/14
USPC .................. 219/78.01, 78.16, 148, 149, 59.1, 219/78.02, 162, 104, 107, 101, 102; 285/21.3, 21.1, 21.2, 332, 423
See application file for complete search history.

(56) References Cited

U.S. PATENT DOCUMENTS

| | | | |
|---|---|---|---|
| 6,323,458 B1 * | 11/2001 | Nomura et al. ............... 219/148 |
| 2004/0035830 A1 * | 2/2004 | Ananthanarayanan et al. ............................ 219/59.1 |
| 2004/0056001 A1 * | 3/2004 | Ananthanarayanan et al. ............................ 219/59.1 |
| 2005/0127044 A1 * | 6/2005 | Nozue et al. ................ 219/78.02 |
| 2008/0231042 A1 * | 9/2008 | Brayman et al. ................ 285/41 |

* cited by examiner

*Primary Examiner* — Thien S Tran
(74) *Attorney, Agent, or Firm* — Jordan IP Law, LLC; Todd A. Vaughn

(57) ABSTRACT

A method for connecting a shaft and a hub, the hub having a first joining portion and a second joining portion for a connection to corresponding joining portions of the shaft. The shaft and the hub are pressed together at contact points in the area of the first joining portions, while the second joining portions are not yet in contact with one another, and a welding current is fed via the contact points of the parts that have been pressed together, so that the contact points fuse. The shaft is pressed into the hub, while the first joining portions are being fused, until substantially a press fit is formed between the second joining portions.

20 Claims, 7 Drawing Sheets

METHOD FOR CONNECTING A SHAFT AND A HUB AND SHAFT-HUB ARRANGEMENT

CROSS-REFERENCE TO RELATED APPLICATIONS

The present application is a National Stage Application of PCT International Application No. PCT/EP2010/070703 (filed on Dec. 23, 2010), under 35 U.S.C. §371, which claims priority to German Patent Publication DE10 2010 005 873.4 (filed on Jan. 27, 2010), which are each hereby incorporated by reference in their respective entireties.

FIELD OF THE INVENTION

A method for connecting a shaft and a hub by pressure resistance welding.

BACKGROUND OF THE INVENTION

During a pressure resistance welding process, two metal parts to be welded are pressed together and a welding current is fed via the contact points of the parts that have been pressed together, so that the contact points fuse. For connecting a shaft and a hub, for example, a joining area of the shaft can be pressed into an aperture formed in the hub, the joining area being oversized in relation to the aperture. The fusing of contact points during the welding process allows the shaft to be pressed into the hub and welded to the latter. A press-fit welding method of this type is disclosed, for example, in EP 1 941 964 A1. Instead of such a press-fit welding process it is also possible, for example, to use a projection welding process for connecting the two parts.

In the known pressure welding methods, however, problems can arise with regard to the attainable joining strength and joining accuracy.

SUMMARY OF THE INVENTION

Accordingly, the object of the invention is to increase the accuracy and strength of a shaft-hub connection.

In accordance with the invention, the hub comprises a first joining portion and a second joining portion for a connection to corresponding joining portions of the shaft. To connect the shaft to the hub, the two parts are pressed together at contact points of the shaft and the hub provided for this purpose in the area of the first joining portions, while the second joining portions are not yet in contact with one another. An electrical welding current is fed via the respective contact points of the parts that have been pressed together, so that the contact points fuse in the area of the first joining portions. While the first joining portions are being fused, the shaft is pressed into the hub, until substantially a press fit is formed between the second joining portions. Now, at the latest, the welding current is discontinued, although this is preferably done even before or while the shaft is being pressed into the hub, in order that the molten metal in the area of the first joining portions can solidify.

The connection between the shaft and the hub is therefore achieved both by a welded joint and by a press fit. Depending on the determining parameters of the welding process, it is also possible for an incipient welded connection to form in the area of the second joining portions, in addition to the press fit. Since the second joining portions do not come into contact at the beginning of the welding process, however, lost currents are substantially avoided and the energy necessarily expended for welding can be minimized.

Only towards the end of the welding process do the second joining portions also come into contact with one another. The seating travel still remaining then produces a press-fit connection between the second joining portions. In this way the hub can be fixed on the shaft particularly firmly and securely. In addition to the increased engineering strength, the existence of both a welded connection and a press fit serves to improve the joining accuracy, that is to say the alignment of the shaft and the hub relative to one another. A smaller-sized welding installation can be used in the method in accordance with the invention, compared to a planar welding of the two parts in a single unified joining area.

In accordance with one embodiment the second joining portions are substantially tapered, a tapering seat being produced between the second joining portions by pressing the shaft into the hub. The substantially tapered profile of the second joining portions may also be curved. For example, the second joining portions may also have a parabolic cross section or the like. The tapering seat provides a self-locking fit and by producing centering effect affords an especially high joining accuracy while maintaining a high engineering strength. In particular, axial forces and bending moments, which act on the shaft or the hub, can be reliably absorbed by the tapering seat. The method in accordance with the invention therefore lends itself even to shaft-hub connections stressed in more than one axis.

For pressing the shaft into the hub, the hub may comprise an aperture, on the inner surface of which at least the second joining portion is formed. If, in addition, the first joining portion of the hub is also formed on the inner surface of the aperture, the first joining portion of the shaft is preferably oversized in relation to the first joining portion of the hub, so that a press-fit welding process can be used, in order to connect the shaft to the hub. However, the first joining portion of the hub may also be formed outside said aperture, for example, on an end face of the hub in the form of a torus, especially for a projection welding process.

The first joining portions may be substantially cylindrical. During the welding a cylindrical shaft portion is therefore then pressed in an axial direction into an undersized aperture or bore, so that the bilateral contact points are cylindrical. This facilitates positioning of the two parts relative to one another. In particular, the respective first joining portions may run precisely parallel to the press-fitting direction. It is possible here that the first joining portions will have a certain curvature deviating from a pure cylindrical shape and/or one or more raised areas.

In accordance with an alternative development one of the first joining portions is substantially cylindrical and the other of the first joining portions is substantially tapered. In particular, the shaft and the hub may be shaped and dimensioned in such a way that when pressing the shaft and hub together a tapered first joining portion of the shaft buts against the rim of an aperture of the hub. Conversely a substantially cylindrical first joining portion of the shaft (in particular a boundary thereof) may interact with a substantially tapered first joining portion of the hub. Alternatively, it is also possible for both of the first joining portions (that is to say of the shaft and the hub) to be substantially tapered, but with different taper angles. Since in these cases the contact points of the shaft and the hub have a relatively small area and in particular form an annular edge (at least at the beginning of the fusion process), a projection welding process can advantageously be performed with a configuration of this type.

In accordance with a further embodiment one of the first joining portions may form a torus and the other of the first joining portions is substantially tapered. A torus is taken to be an annular surface which extends substantially within a normal plane to the axis of the shaft or the hub. Alternatively both of the first joining portions may forth a respective torus. In this embodiment, also, a projection welding process may be performed, particularly if a raised area is formed on at least one of said toruses, as is explained below.

In the aforementioned embodiments at least one a raised area may be provided on the first joining portion of the hub and/or on the first joining portion of the shaft, in order to form said contact points when the shaft and the hub are pressed together. The raised area may form a "projection" for performing a projection welding process. In accordance with the application, the raised area may be arranged on the inner surface of an aperture of the hub or on an end face of the hub or the shaft, that is to say outside the aperture and in particular on the aforementioned torus.

The introduction of the welding current may be terminated at the latest when the second joining portions have entered into the press fit. However, the welding current is preferably introduced only for a relatively short period at the beginning of the pressure welding process. In the same way as the welding current and the aggregate welding energy introduced, the precise timing for termination of the welding process may be adjusted to the particular application.

A welding together of the second joining portions is preferably deliberately forestalled, in order to obtain a press fit of the highest possible accuracy and to avoid an excessive energy input. As mentioned above, however, a slightly pronounced, welding of the shaft and the hub may also be provided in the area of the second joining portions.

In accordance with one embodiment the respective first joining portion and the respective second joining portion are arranged substantially in immediate proximity to one another in an axial direction, that is to say the respective first joining portion and the respective second joining portion directly adjoin one another, or only a transitional portion which is relatively short compared to the axial extent of the joining portions is situated between the respective first joining portion and the respective second joining portion. This ensures a compact construction and a reliable overall connection. The transitional portion is preferably configured in such a way that it can absorb excess molten or deformed material, which is produced during the welding process. In alternative embodiments, however, the respective first joining portion and the respective second joining portion may also be arranged widely separated from one another.

The invention also relates to an arrangement of a shaft and a hub, wherein the hub comprises a first joining portion and a second joining portion for a connection to corresponding joining portions of the shaft, wherein the two parts are welded together at the first joining portions, in particular by pressure resistance welding, and wherein the two parts are pressed together at the second joining portions. Such a pressure-welded shaft-hub arrangement can be stressed in more than one axis and ensures a high running accuracy. Since only a single welded joint is provided, a small-scale welding installation is sufficient for producing the shaft-hub connection.

Developments of the invention are specified in the dependent claims, the description and the drawings attached.

BRIEF DESCRIPTION OF THE DRAWINGS

The invention is described below on the basis of an exemplary embodiment and with reference to the drawings.

DETAILED DESCRIPTION OF EMBODIMENTS

Figure 1:
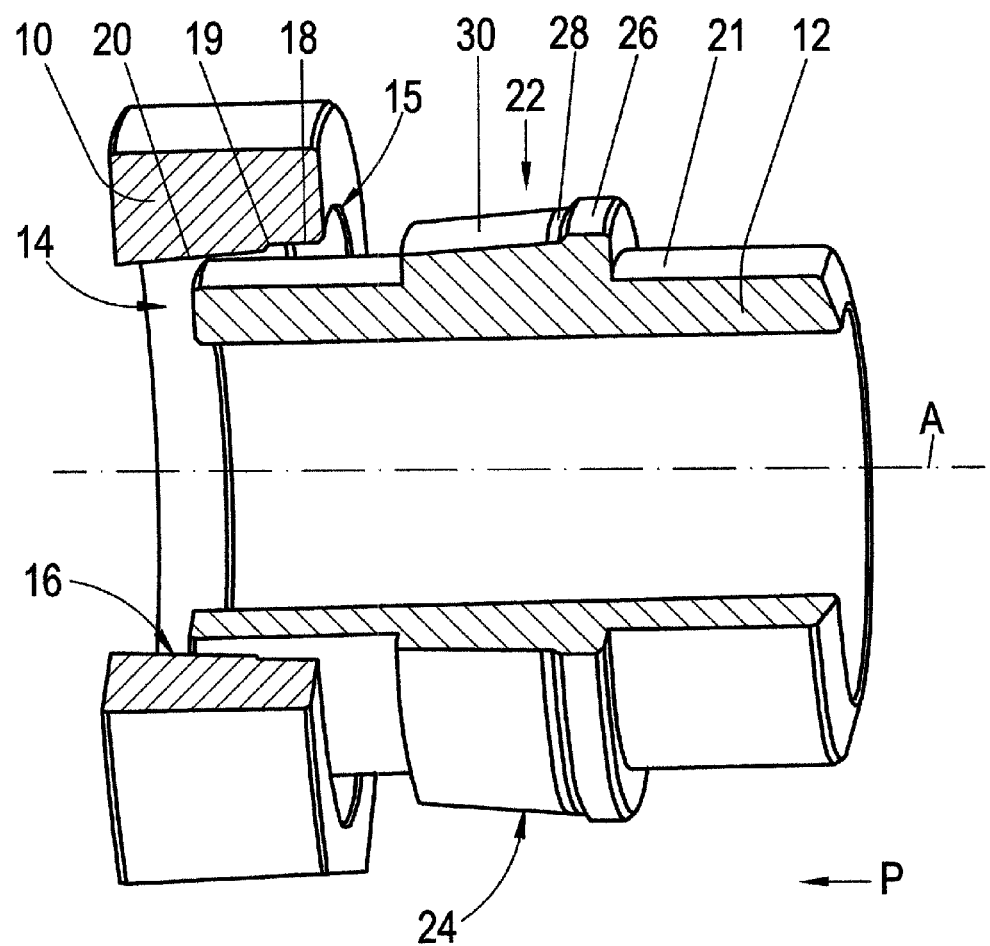
FIG. 1 illustrates a perspective view of a shaft and a hub to be connected thereto in accordance with a first embodiment of the invention in a longitudinal section.

FIG. 1, by way of example, represents a hub 10, which is to be welded to a shaft 12. The hub 10 and the shaft 12 are composed of a steel material usual for transmission components. In the example illustrated the hub 10 is annular and has a central, circular aperture 14 with an end-face orifice 15. The inner surface 16 of the aperture 14 is divided in an axial direction into a first joining portion 18, an adjoining transitional portion 19 and a second joining portion 20 in turn adjoining the transitional portion 19.

A circumferential, that is to say annular raised area 22, which is intended to be pressed into the aperture 14 of the hub 10, is provided on the outer circumferential surface 21 of the shaft 12, here embodied as a hollow shaft. Like the inner surface 16 of the aperture 14, the generated surface 24 of the raised area 22 is divided in an axial direction into a first joining portion 26, an adjoining transitional portion 28 and a second joining portion 30 in turn adjoining the transitional portion 28.

The respective first joining portions 18, 26 and the respective second joining portions 20, 30 are of complementary shape, the first and second joining portions 26, 30 of the raised area 22 being oversized in relation to the corresponding joining portions 18, 20 of the aperture 14. As can be seen from FIG. 1, the first joining portions 18, 26, like the transitional portions 19, 28, are preferably cylindrical, while the second joining portions 20, 30 are tapered. In the exemplary embodiment shown the angle by which the second joining portions 20, 30 are inclined in relation to the axis A is approximately 5°. It can be adapted to the respective application within wide ranges, but is preferably between 1° and 15°.

Figure 2:
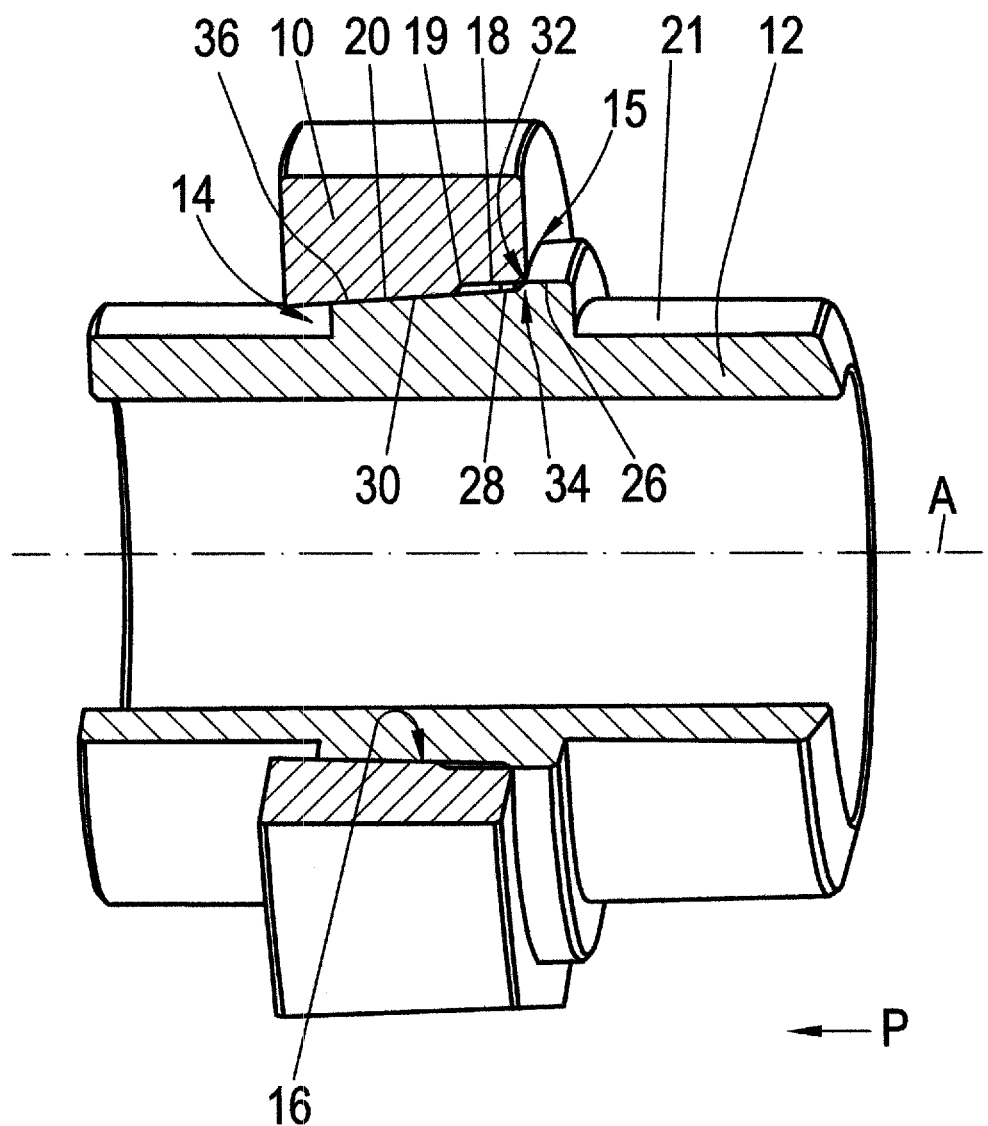
FIG. 2 illustrates the shaft and the hub of FIG. 1 at the beginning of a pressure welding process.

To connect the shaft 12 to the hub 10, the two parts are aligned substantially coaxially and the raised area 22 of the shaft 12 is pressed on to the orifice 15 of the aperture 14 in the area of the first joining portions 18, 26, as is illustrated in FIG. 2. The shaft 12 and the hub 10 are in contact with one another at the respective contact points 32, 34 of the first joining portions 18, 26. By feeding an electrical welding current via the contact points 32, 34 a welding process is started, during which the contact points 32, 34 are fused. During the welding process, that is to say while a welding current continues to be fed via the respective contact points along the first joining portions 18, 26 or while the contact points 32, 34 are still being fused with the welding current already interrupted, the shaft 12 is subjected to a force in a press-fitting direction P pointing parallel to the axis A, so that the shaft 12 is progressively pressed into the aperture 14 of the hub 10. The press-fit welding can moreover be performed in a manner similar to that described in EP 1 941 964 A1, referred to at the outset. In particular, measures can be provided for centering the parts 10, 12, such as a chamfer on the aperture 14, for example, or a centering spigot on the raised area 22.

The tapered shape of the second joining portions 20, 30 gives rise to an air gap 36 between them, so that the welding current flows substantially only via the relatively small area of the first joining portions 18, 26.

Figure 3:
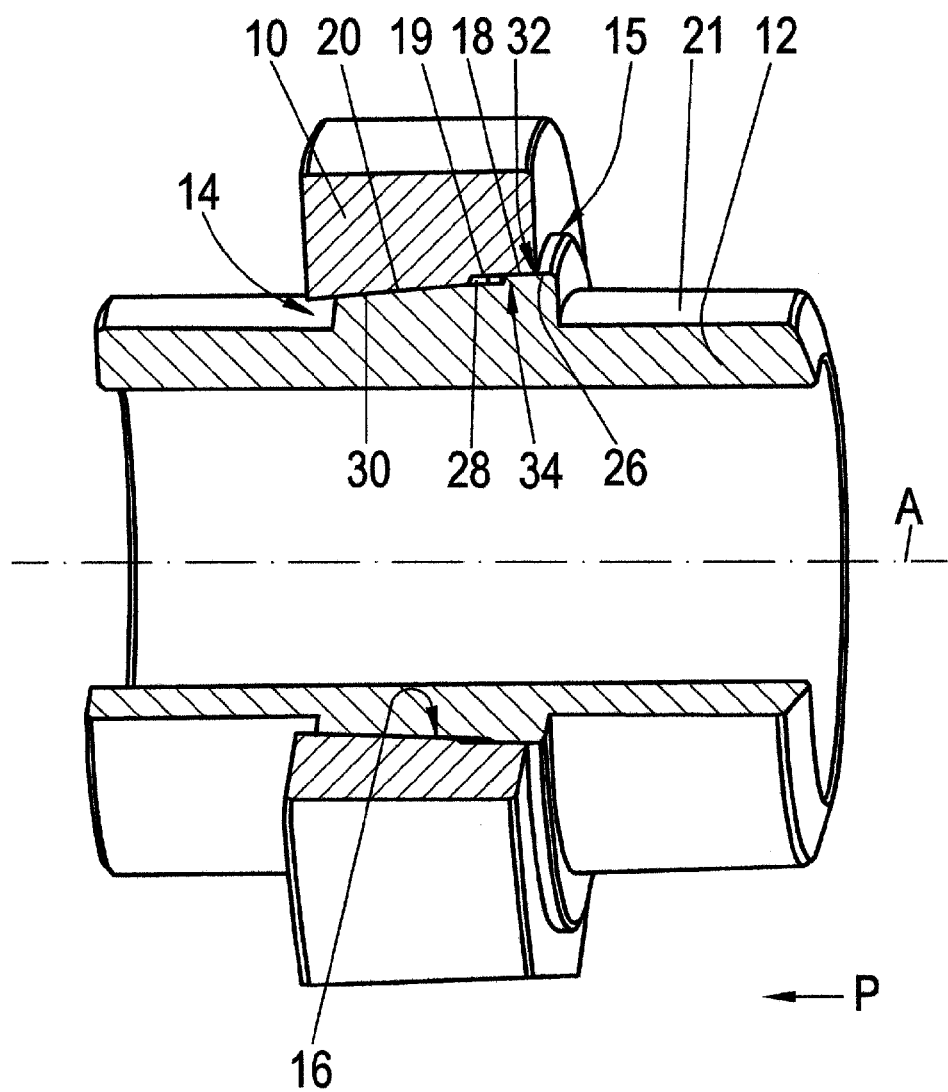
FIG. 3 illustrates the shaft and the hub of FIG. 1 shortly before the end of the pressure welding process.

As illustrated in FIG. 3, shortly before the end of the seating travel the shaft 12 and the hub 10 also come into contact with one another in the area of the second joining portions 20, 30. In the course of the remaining seating travel a press fit in the form of a self docking tapering seat 41 is formed between the shaft 12 and the hub 10 (cf. FIG. 4). The axial end position of the shaft 12 in the hub 10 can be defined in that the relative movement between the components terminates on reaching a specific pressure or a specific travel. The welding current only flows for a relatively brief time on commencement of the welding process, typically for a few milliseconds.

Figure 4:
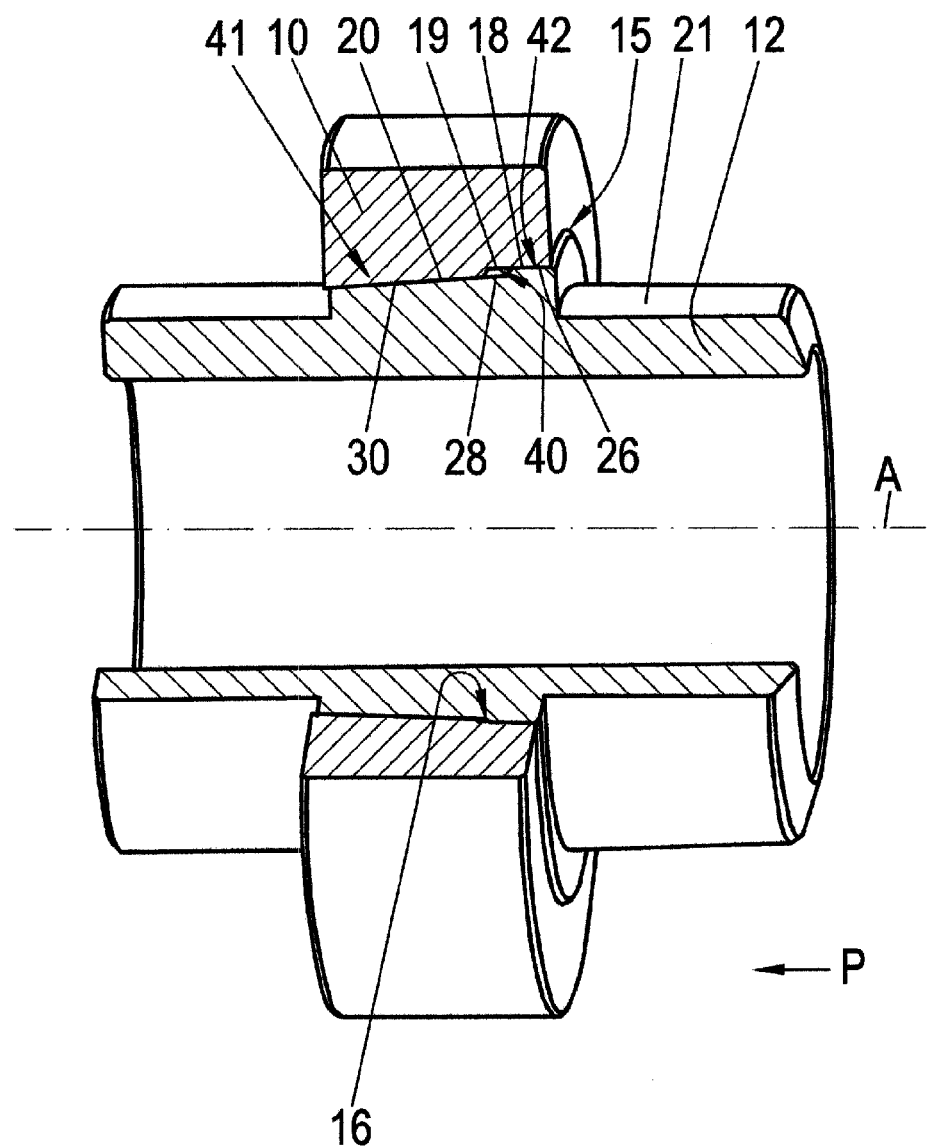
FIG. 4 illustrates the shaft and the hub of FIG. 1 on completion of the pressure welding process.
Figure 5:
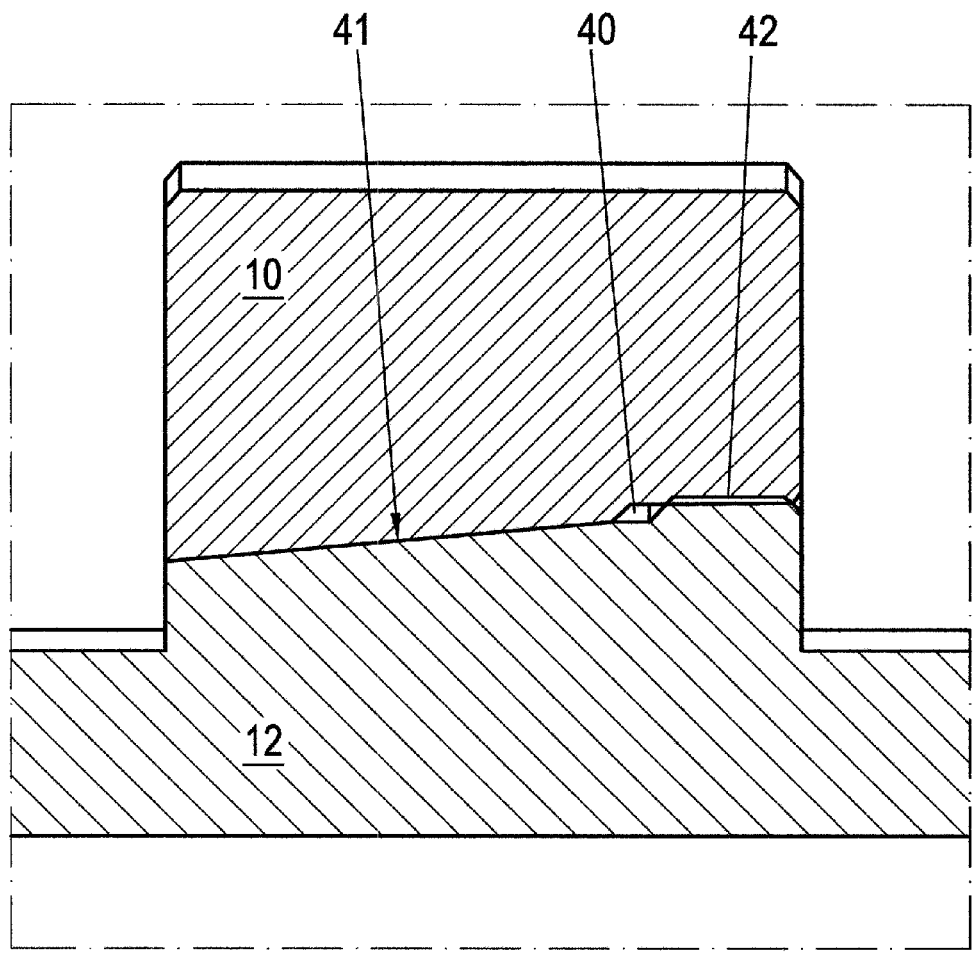
FIG. 5 illustrates an enlarged sectional view of the shaft and hub of FIG. 1 connected together.

An arrangement like that represented in FIGS. 4 and 5, for example, results following the press-fit welding. A connection, which comprises a weld 42 in the area of the first joining portions 18, 26 and a tapering seat 41 in the area of the second joining portions 10, 30, exists between the shaft 12 and the hub 10. The weld 42 and the tapering seat 41 are separated by a narrow circumferential air gap 40 in the area of the transitional portions 19, 28. The combination of a press-fit and a welded connection affords a high degree of joining accuracy while at the same time ensuring great strength. Since the welding current flows only in the area of a single, closely restricted welded joint, it is possible to save welding energy.

Figure 6:
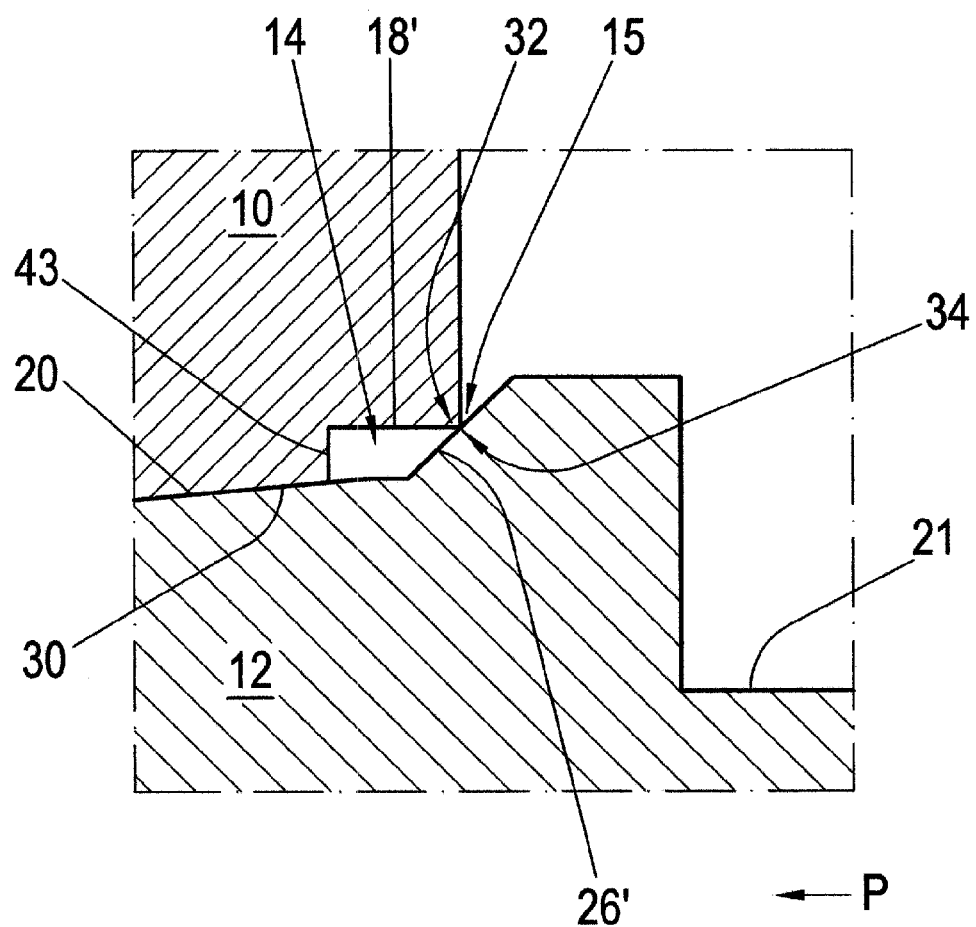
FIG. 6 illustrates a partial sectional view of a shaft and a hub to be connected thereto in accordance with a second embodiment of the invention.

In the embodiment represented in FIGS. 1 to 5 the configuration of the first joining portions 18, 26 is adapted for a press-fit welding process. Alternatively the configuration of the first joining portions may also be adapted for a projection welding process. Such an embodiment is illustrated in FIG. 6, in which for the sake of simplicity the same or equivalent elements are denoted by the corresponding reference numerals to those in FIGS. 1 to 5. Here the first joining portion 26' of the shaft 12 is of tapering design and when the shaft 12 and the hub 10 are pressed together it buts against the orifice 15 of the aperture 14. The contact points 32, 34 are therefore limited to a small, annular rim-like area. The edge of the orifice 15 therefore acts as projection for generating a current density sufficient for the purposes of a projection welding process. In this embodiment (depending on the taper angle of the first joining portion 26' of the shaft 12) the first joining portion 18' of the hub 10 is ultimately formed by a cylindrical surface and/or a torus surrounding the contact point 32. The second joining portions 20, 30 are configured in the same way as in the aforementioned first embodiment, that is to say, at the end of the welding process a tapered press fit exists between them. As can be seen from FIG. 6, a step 43 is formed between the first joining portion 18' and the second joining portion 20 of the hub 10.

Figure 7:
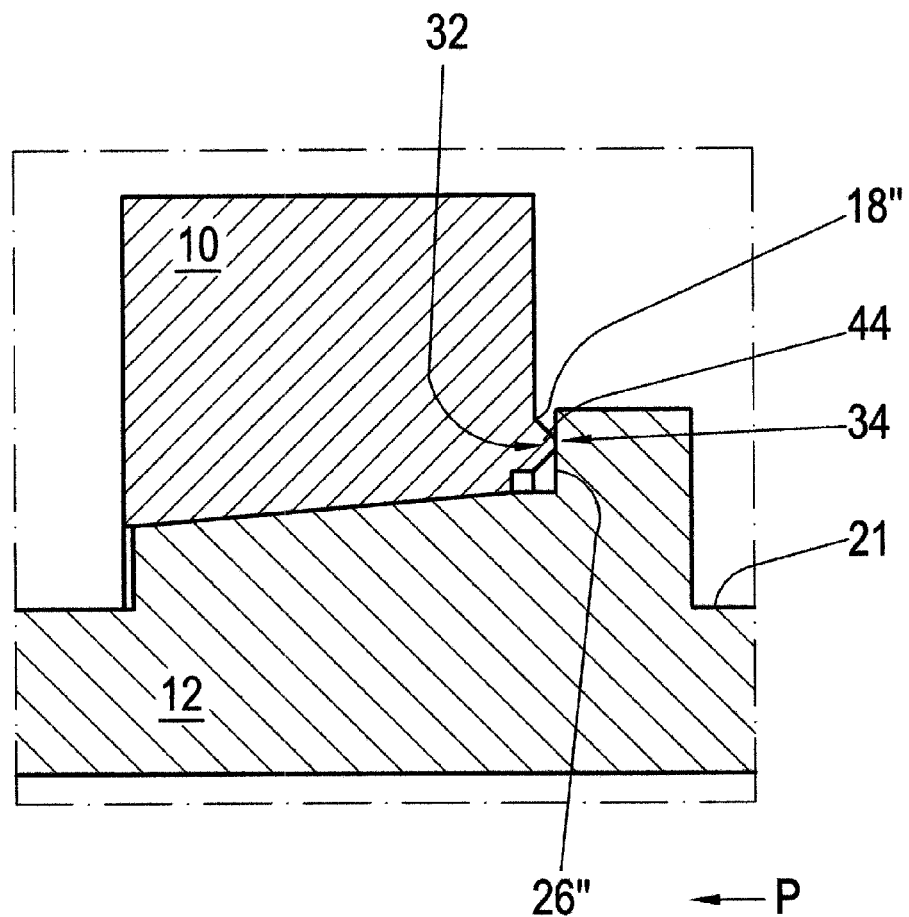
FIG. 7 illustrates a partial sectional view of a shaft and a hub to be connected thereto in accordance with a third embodiment of the invention.

FIG. 7 shows a further embodiment of the invention, in which the configuration of the first joining portions is adapted for a projection welding process as in the embodiment In accordance with FIG. 6. In this embodiments raised area in the form of a circumferential ridge 44 is provided along a torus at an end face of the hub 10, said torus corresponding to the first joining portion 18" of the hub 10. When the shaft 12 and the hub 10 are pressed together, the ridge 44 buts against the first joining portion 26" of the shaft 12, running at right-angles to the press-fitting direction P, which likewise forms a torus. At the protruding end of the ridge 44 the contact points 32, 34 of the shaft 12 and the hub 10 have a small area, so that a current density sufficient for a projection welding process is generated. Instead of the ridge 44, differently formed or arranged projections, which act as "projection" in the welding process, may be provided on the hub 10 and/or on the shaft 12.

LIST OF REFERENCE NUMBERS 10 hub
12 shaft
14 aperture
15 orifice
16 inner surface
18, 18', 18" first joining portion of the hub
19 transitional portion of the hub
20 second joining portion of the hub
21 outer circumferential surface
22 raised area
24 generated surface
26, 26', 26" first joining portion of the shaft
28 transitional portion of the shaft
30 second joining portion of the shaft
32 contact point of the hub
34 contact point of the shaft
36 air gap
40 air gap
41 tapering seat
42 weld
43 step
44 ridge
A axis
P press-fitting direction

What is claimed is:

1. A method for connecting metal parts, the method comprising:
    providing a hub composed of a metal and having an inner surface thereof with a first hub joining portion, a second hub joining portion and a transitional hub portion adjoining the first and second hub joining portions;
    providing a shaft composed of a metal and having a raised area at an outer circumferential surface thereof with a first shaft joining portion, a second shaft joining portion and a transitional shaft portion adjoining the first and second shaft joining portions, wherein the first shaft joining portion corresponds in shape to the first hub joining portion, the second shaft joining portion corresponds in shape to the second hub joining portion;
    pressing, while the second hub joining portion and the second shaft joining portion are not in contact with one another, and the shaft and the hub are joined together at a first contact point of the first hub joining portion and a second contact point of the first shaft joining portion;
    feeding a welding current via the first contact point and the second contact point that have been pressed together so that the first contact point and the second contact point fuse at the first hub joining portion and the first shaft joining portion; and then
    pressing the shaft into the hub by subjecting the shaft to a force in a press-fitting direction which is parallel to an axis extending coaxially between the shaft and the hub, until a press fit is formed at the second hub joining portion and the second shaft joining portion.

2. The method of claim 1, wherein the welding current is discontinued before the shaft is pressed into the hub.

3. The method of claim 1, wherein the welding current is discontinued while the shaft is pressed into the hub.

4. The method of claim 1, wherein the first hub joining portion and the first shaft joining portion are cylindrical in cross-section.

5. The method of claim 1, wherein the transitional hub portion and the transitional shaft portion are cylindrical in cross-section.

6. The method of claim 1, wherein the second hub joining portion and the second shaft joining portion is tapered relative to the axis.

7. The method of claim 1, wherein the second hub joining portion and the second shaft joining portion is inclined at a predetermined angle relative to the axis.

8. The method of claim 7, wherein the predetermined angle is 5°.

9. The method of claim 7, wherein the predetermined angle is between 1° and 15°.

10. The method of claim 1, wherein, during the feeding of the welding current, the transitional hub portion is to absorb excess molten or deformed material produced during the welding process.

11. The method of claim 1, wherein, during the feeding of the welding current, the transitional shaft portion is to absorb excess molten or deformed material produced during the welding process.

12. A method for connecting metal parts, the method comprising:
 providing a hub composed of a metal and having an inner surface thereof with a first hub joining portion, a second hub joining portion and a transitional hub portion adjoining the first and second hub joining portions;
 providing a shaft composed of a metal and having a raised area at an outer circumferential surface thereof with a first shaft joining portion, a second shaft joining portion and a transitional shaft portion adjoining the first and second shaft joining portions;
 aligning the shaft and the hub so as to have an axis extending coaxially therebetween;
 pressing, while the second hub joining portion and the second shaft joining portion are not in contact with one another, and the shaft and the hub are joined together at a first contact point of the first hub joining portion and a second contact point of the first shaft joining portion to form an air gap between the second hub joining portion and the second shaft joining portion; and then
 subjecting the shaft, while the first hub joining portion and the first shaft joining portion are being fused, to a force in a press-fitting direction which is parallel to the axis, until a press fit is formed at the second hub joining portion and the second shaft joining portion.

13. The method of claim 12, wherein the second hub joining portion and the second shaft joining portion are tapered relative to the axis of the shaft such that a tapered seat is produced between the second joining portions when the press fit is formed.

14. The method of claim 12, wherein:
 the first hub joining portion and the first shaft joining portion are cylindrical in cross-section;
 the transitional hub portion and the transitional shaft portion are cylindrical in cross-section; and
 the second hub joining portion and the second shaft joining portion is tapered relative to the axis.

15. The method of claim 12, wherein the second hub joining portion and the second shaft joining portion is inclined at a predetermined angle relative to the axis.

16. The method of claim 15, wherein the predetermined angle is 5°.

17. The method of claim 15, wherein the predetermined angle is between 1° and 15°.

18. The method of claim 12, wherein, during the feeding of the welding current, the transitional hub portion is to absorb excess molten or deformed material produced during the welding process.

19. The method of claim 12, wherein, during the feeding of the welding current, the transitional shaft portion is to absorb excess molten or deformed material produced during the welding process.

20. A method for connecting metal parts, the method comprising:
 providing a hub composed of a metal and having an inner surface thereof with a first hub joining portion, a second hub joining portion and a transitional hub portion adjoining the first and second hub joining portions;
 providing a shaft composed of a metal and having a raised area at an outer circumferential surface thereof with a first shaft joining portion, a second shaft joining portion and a transitional shaft portion adjoining the first and second shaft joining portions, wherein the first shaft joining portion corresponds in shape to the first hub joining portion, the second shaft joining portion corresponds in shape to the second hub joining portion;
 pressing, while the second hub joining portion and the second shaft joining portion are not in contact with one another, and the shaft and the hub are joined together at a first contact point of the first hub joining portion and a second contact point of the first shaft joining portion;
 fusing the first contact point and the second contact point fuse at the first hub joining portion and the first shaft joining portion by feeding a welding current via the first contact point and the second contact point; and then
 forming a press fit at the second hub joining portion and the second shaft joining portion by discontinuing the welding current and then subjecting the shaft to a force in a press-fitting direction which is parallel to an axis extending coaxially between the shaft and the hub.

* * * * *